United States Patent Office 2,943,663
Patented July 5, 1960

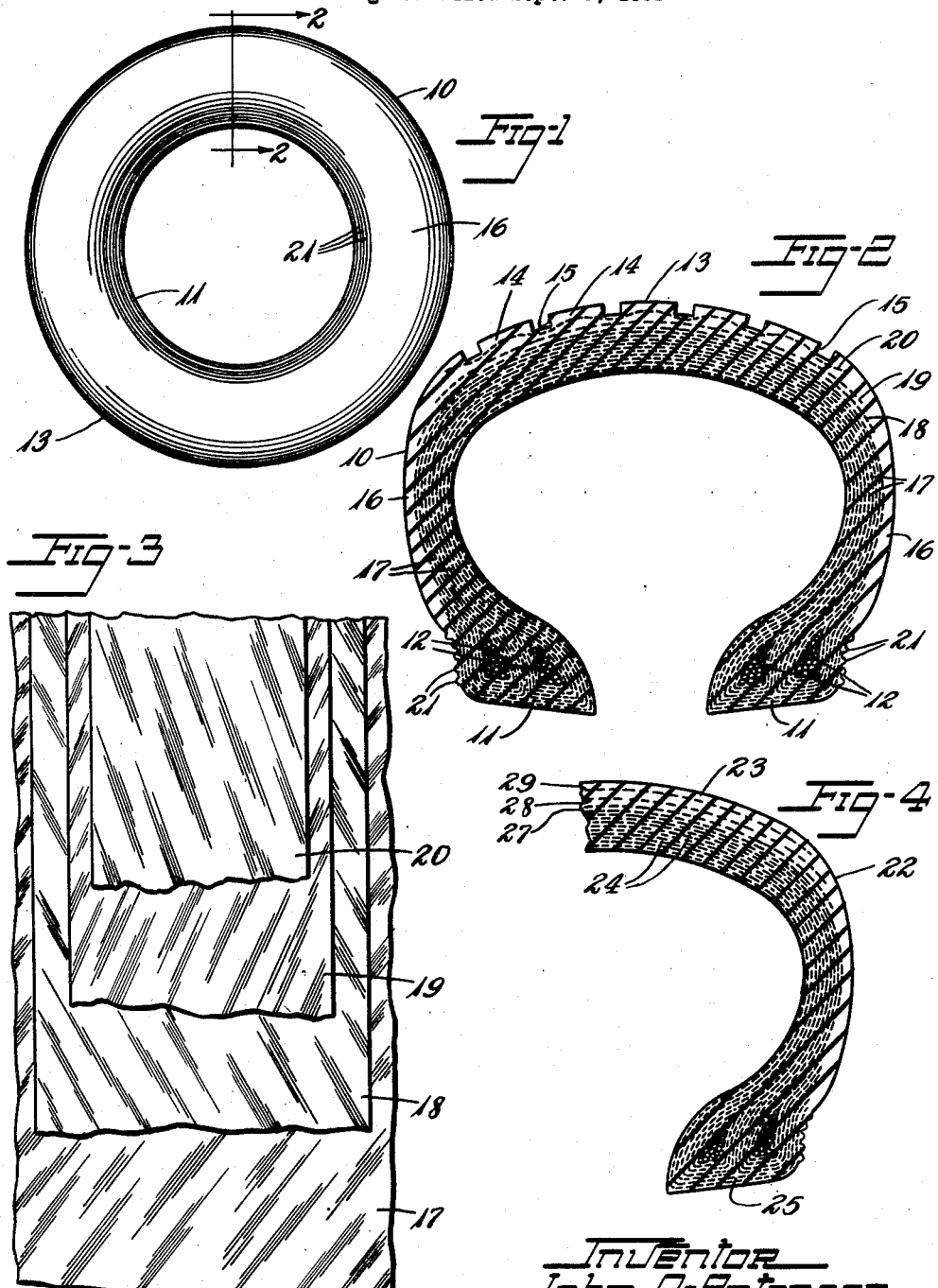
July 5, 1960     J. O. ANTONSON     2,943,663
TIRE CONSTRUCTION
Original Filed Sept. 6, 1951
Inventor
John O. Antonson
By Harold S. Meyer
Atty.

2,943,663
TIRE CONSTRUCTION

John O. Antonson, Tallmadge, Ohio, assignor to The B. F. Goodrich Company, New York, N.Y., a corporation of New York Continuation of application Ser. No. 245,340, Sept. 6, 1951. This application Jan. 4, 1960, Ser. No. 2,090

6 Claims. (Cl. 152—356)

This invention relates to an improved tire construction and especially to a construction for aircraft tires which are operated at exceedingly high landing speeds of 200 miles per hour and over.

In high speed operation of aircraft tires the high frequency flexing of the tire walls has been objectionable and the inflation pressure has been increased to reduce the amount of flexing. The high inflation pressure in the tires has reduced the flexing but the action of the forces resulting from the inflation pressure plus the high centrifugal force developed at high speeds has urged the radially outer wall of the tire outward changing the tread profile in cross section from a tread face having a large radius of curvature to a tread face with a small radius of curvature. The reduction in radius of curvature of the tread face has resulted in a reduction in the area of the tread which supports the tire and an increase in stress concentration in the portion of the tire underlying the relatively small tread area which contacts the ground.

The decrease in flexing of the tire walls has also caused an increase in the stresses within the tread as the forces which had been cushioned by the flexing of the walls in tires with relatively low inflation pressures have had to be cushioned by the deformation of the tread. The high stresses developed in the localized central portions of the treads have caused repeated deformation within the tread and the concentrated stresses have generated excessive heat leading to failure of the tire.

The high centrifugal force developed at high speeds tends to throw the tread off the tire body and subjects the adhesive bond at the interface between the tread and tire body to exceedingly high stresses. In addition, the sudden change in elasticity at the interface separating the highly elastic tread from the relatively stiff tire body has caused a weakness at the interface in the tire at high speeds because of the tendency of the tread to move relative to the tire body and the inability of the tread and tire body to operate together to resist forces acting on the tire.

After landing of high speed aircraft the load on the tires may be relatively light because the aircraft is still partly airborne at high landing speeds. The fact that the load on the tires is not great has not materially increased the resistance of the tires to failure because the area of the tread in contact with the ground has been so small due to the distorted tread profile that the stress resulting from the load have been concentrated in a correspondingly small portion of the tread resulting in comparatively high stresses in the tread.

It can be seen that the problems encountered in high speed operation of tires are radically different from the problems of low speed tire operation and that a need for an improved tire construction has arisen with the advent of aircraft which land at high speeds of 200 miles per hour or more.

It is an object of this invention to provide a high pressure tire for resisting distortion of the tread profile at high speeds.

Further objects are to provide for resisting stretching of the tread face; to provide for gradually varying the elasticity of the tire from the tire body to the tread face; to provide for increasing the stability of the tread; to provide a variation in elasticity of the tire by changing the disposition of the cord plies; to provide for retaining the tread on the tire body at high speeds; to provide for ease of manufacture and to provide for increased wear resistance and strength.

These and other objects will be apparent from the following description and from the drawings in which:

Fig. 1 is an elevation of a tire constructed in accordance with and embodying the invention.

Fig. 2 is a section taken along line 2—2 of Fig. 1.

Fig. 3 is a plan view of the plies of the tire of Figs. 1 and 2 showing the position of the cords in the plies prior to molding into a tire, parts being broken away.

Fig. 4 is a sectional view like Fig. 2 of a modified construction, parts being broken away.

Referring to the drawings, a tire is shown in Figs. 1 and 2 which is suitable for mounting on the wheel of an airplane which lands at speeds exceeding 200 miles per hour. The complete tire is in the form of an annular hollow body 10 of cord plies and resilient rubber or other rubber-like material and is open at the radially inner portion. The tire includes the usual bead portions 11, 11 disposed at the margins of the opening and may have a pair of wire beads 12, 12 in each of the bead portions 11, 11 for retaining the tire on the rim of a wheel at high speeds.

A tread 13 of suitable resilient rubber material is disposed at the radially outer face of the tire and preferably has a thread profile in cross section with a relatively large radius of curvature to provide the maximum ground contact area of the tire. The tread 13 may have ribs 14, 14 extending circumferentially of the tire which are separated by grooves 15, 15. Sidewalls 16, 16 of the tire extend radially outward from the bead portions 11, 11 and merge into the tread 13.

Reinforcing cord plies 17, 17 which may be of weftless or weak-wefted construction are embedded in the tire body with the cords extending substantially transversely of the tire for retaining the high pressure inflating air in the tire and for resisting impacts on the tire. Preferably the material of the plies 17, 17 is of a twisted fibrous construction such as nylon and may be of cotton, rayon or the like which have the property of withstanding a large amount of flexing because of their twisted fibrous construction. As shown in Fig. 2 the innermost reinforcing plies 17, 17 extend through the tire body from bead portion 11 to bead portion 11 and around the beads 12, 12 providing a strong unitary carcass for the tire body 10. A group of tread reinforcing plies 18, 19, and 20 preferably constituting less than one half the total number of plies are embedded in the tread 13 of the tire to resist distortion of the profile of the tread by the action of the large aforementioned centrifugal forces exerted upon the tire at high speeds and the action of the high pressure inflating air in the tire which tends to decrease the radius of curvature of the tread.

In the embodiment shown in Fig. 2, the plies 18, 19 and 20 of the group in the tread 13 may be spaced one from the other at equal distances radially of the tire in the zones under the tread grooves 15, 15, but are spaced apart at a greater distance than the plies 17, 17 of the tire body which extend from bead portion 11 to bead portion 11, and are spaced by layers of rubber that increase in thickness as the tread face is approached in the zones under the ribs 14, 14. In addition the plies 18, 19 and 20 terminate short of the bead portions 11, 11 and consequently provide the tread 13 with greater elasticity than the carcass portion of the tire body 10 having the closely spaced plies 17, 17. However plies 18, 19 and 20 cause the tread to have less elasticity than a tread without such plies therein.

In order to best resist the aforementioned distortion of the profile and to maintain the larger radius of curvature of the tread, the cord plies in the tread should have cords therein extending at very small angles from the longitudinal direction of the tire, in the order of 20°. From other standpoints, however, such a low angle is suitable only in the outermost ply. For satisfactory flex resistance in the tire body, reinforcing plies 17, 17 must extend at a substantially greater angle to the longitudinal direction of the tire, preferably in the order of 38°. The desirability of the latter cord angle in the tire carcass is well known. In order to transfer the stresses in the low angle tread plies 18, 19 and 20 to the higher angle carcass plies 17, 17 of the tire body with the least possibility of causing separation within the tread proper and between the tread and carcass, the angle of the cords of the tread plies 18, 19 and 20 increase progressively from the outermost to the innermost tread ply. As a result there is a gradual transition from optimum resistance to longitudinal expansion near the tread periphery to optimum combined longitudinal and lateral strength in the carcass. Thus not only are loads distributed gradually from the ground to the carcass because of the tread plies, but the aforesaid arrangement of tread plies helps maintain the desired broad tread contour. For example, as shown in Fig. 3 the cord plies of the reinforcing plies 17, 17 of the tire body 10 are built with the cords at a longitudinal bias angle of about 38°; the inner tread ply 18 adjacent to and disposed outwardly of the plies 17, 17 has cords at a longitudinal bias angle of 30°; the next outer tread ply, 19, has cords at an angle of 25°; and the outermost tread ply 20 has cords at an angle of 20°. By so reducing the cord angle in the outermost plies the elasticity of the tread portion is gradually decreased from the outer face toward the tire body 10, which provides a gradual change in the modulus of elasticity throughout the thickness of the tire and results in improved distribution of stresses in the tire. By decreasing the angle between the cords of the outermost plies 18, 19 and 20 and the longitudinal direction of the tire the ability of the tire to retain the tread 13 on the tire body 10 is materially increased.

As shown in Fig. 2 the outermost ply 20 extends radially outward into the ribs 14, 14 of the tread 13 and thereby reinforces the ribs and the portions of the tread at the grooves 15, 15 providing increased stability and strength of the tread.

The tire may be used with or without an inner tube and suitable sealing means such as circumferentially extending ribs 21, 21 may be disposed at the outer face of the bead portion 11 to aid in retaining air in the tire when it is used without an inner tube.

In operation of the tire 10 on aircraft which have landing speeds exceeding 200 miles per hour the tread 13 is restrained from excessive outward movement and held by the group of plies 18, 19 and 20 embedded in the tread portion 13 to a transverse curvature with a relatively large radius. Therefore the maximum area of tread surface is brought in contact with the ground at the light loads which are placed upon the tire in the high speed landing runs, and the amplitude of deflection is held to a minimum. There is a minimum amount of flexing of the tire and the stresses accompanying the flexing action are distributed over a relatively large area so that the heat generated in the tread will be insufficient to cause failure. Furthermore by varying the elasticity of the tread face radially inward through the tire body 10 a sudden change in the modulus of elasticity does not take place at the interface between the tread 13 and the carcass portion of tire body 10. Instead the graduated change in elasticity provides for even distribution of the stresses over the entire tire providing long wearing qualities and increased strength.

Referring to Fig. 4 another embodiment is shown in which a tire 22 has a smooth faced tread 23. Reinforcing cord plies 24, 24 which may be of weftless or weak-wefted construction are embedded in the resilient rubber body material of the tire and have cords extending in a generally transverse direction of the tire. The plies at the radially inner portion of the tire extend from bead portion 25 to bead portion 25 and a group of plies 27, 28 and 29 are embedded in the tread and terminate short of the bead portions. The reinforcing plies 24, 24 and the group of plies 27, 28 and 29 in the tread 23 are preferably of the same twisted fibrous cord material such as nylon, rayon, cotton or the like which have long life under continued flexing.

The plies 24, 24 which extend from bead portion 25 to bead portion 25 are separated by layers of resilient rubber material of substantially the same thickness. However the group of plies in the tread 23 are separated by layers of rubber of increasing thickness as the plies approach the tread face. As shown in Fig. 4 the inner ply 27 is closer to the middle ply 28 than the outer ply 29 is to the middle ply 28 and this graduated spacing is desirable in that it provides a tire with increasing elasticity toward the tread face 23. Also the proximity of the outermost plies 28 and 29 to the face of the tread 23 provides maximum resistance to distortion of the tread in operation and provides increased stability of the tire.

It is contemplated that the term "rubber" as employed in this specification and the appended claims includes both natural and man-made rubber materials, and the term "cord" includes both natural and synthetic elongated tension elements unless otherwise specified.

This is a continuation of my co-pending application Serial No. 245,340 filed September 6, 1951, now abandoned.

Variations may be made without departing from the scope of the invention as it is defined in the following claims.

I claim:

1. A high speed generally toroidal pneumatic tire having laterally spaced radially inward bead portions, a generally toroidal carcass portion connecting said bead portions, and a peripheral tread portion, said carcass portion comprising a plurality of crossing bias-laid plies of cord material extending from bead to bead and embedded in rubber, said tread portion comprising a body of tread rubber bonded to said carcass portion, said tread rubber having embedded therein radially outward of said carcass plies at least three tread plies, said tread plies each comprising a layer of elongated generally parallel cords embedded in rubber with the individual cords in each ply extending generally transversely of the tire at an acute longitudinal bias angle to the circumferential centerline of the ply, and with each tread ply extending circumferentially of the tire, and stopping a substantial distance short of said beads in the lateral extent of the ply, said tread plies being radially spaced from one another by distances greater than the spacing between the plies in the carcass portion with the outermost tread ply disposed adjacent the periphery of the tread and with the innermost tread ply spaced from said carcass plies.

2. A high speed generally toroidal pneumatic tire having laterally spaced radially inward bead portions, a generally toroidal carcass portion connecting said bead portions, and a peripheral tread portion having a smooth ground engaging surface, said carcass portion comprising a plurality of crossing bias-laid plies of cord material extending from bead to bead and embedded in rubber, said tread portion comprising a body of tread rubber bonded to said carcass portion, said tread rubber having embedded therein radially outward of said carcass plies at least three tread plies, said tread plies each comprising a layer of elongated generally parallel cords embedded in rubber with the individual cords in each ply extending generally transversely of the tire at an acute longitudinal bias angle to the circumferential center-line of the ply, and with each tread ply extending circumferentially of the tire, and stopping a substantial distance short of said beads in the lateral extent of the ply, said tread plies being radially spaced from one another by distances greater than the distances between the plies in the carcass portion with the outermost tread ply disposed adjacent the periphery of the tread and with the innermost tread ply spaced from said carcass plies, the radial spacing of said tread plies progressively decreasing from the radially outer to the radially inner plies.

3. A high speed generally toroidal pneumatic tire having laterally spaced radially inward bead portions, a generally toroidal carcass portion connecting said bead portions, and a peripheral rubber tread portion, said carcass portion comprising bias-laid plies of cord material extending from bead to bead and embedded in rubber, said tread portion comprising a body of tread rubber bonded to said carcass portion, said tread rubber having embedded therein a plurality of tread plies, said tread plies each comprising a circumferentially extending layer of elongated generally parallel cords embedded in rubber with the individual cords in each tread ply extending transversely of the tire and at an acute longitudinal bias angle to the circumferential center line of the ply and with the angular direction of the cords in adjacent tread plies alternating, each of said tread plies being radially spaced from adjacent tread plies by distances greater than the distances between the plies in the carcass portion with the outermost tread ply disposed adjacent the periphery of the tread and with the innermost tread ply spaced from said carcass plies, the longitudinal bias angle of said tread plies increasing from a bias angle in the order of 20 degrees to a bias angle less than that of the outermost carcass ply when passing from a radially outer tread ply to a radially inner tread ply.

4. A high speed generally toroidal pneumatic tire having laterally spaced radially inward bead portions, a generally toroidal carcass portion connecting said bead portions, and a peripheral tread portion, said carcass portion comprising bias-laid plies of cord material extending from bead to bead and embedded in rubber, said tread portion comprising a body of tread rubber bonded to said carcass portion, said tread rubber having embedded therein a plurality of alternately bias laid tread plies, said tread plies each comprising a layer of elongated generally parallel cords embedded in rubber with the individual cords in each ply extending generally transversely of the tire and with each tread ply extending circumferentially of the tire, said tread plies being radially spaced from one another by distances greater than the distances between the plies in the carcass portion with the outermost tread ply disposed adjacent the periphery of the tread and with the innermost tread ply spaced from said carcass plies, the longitudinal bias angle of said tread plies increasing progressively from the outer to the inner tread ply by an amount in the order of 5° per ply and the longitudinal bias angle of the inner tread ply being less than that of the outer carcass ply.

5. A high speed generally toroidal pneumatic tire having laterally spaced radially inward bead portions, a generally toroidal carcass portion connecting said bead portions, and a peripheral tread portion, said carcass portion comprising bias-laid plies of cord material extending from bead to bead and embedded in rubber, said tread portion comprising a body of tread rubber bonded to said carcass portion, said tread rubber having embedded therein a plurality of alternately bias laid tread plies, said tread plies each comprising a layer of elongated generally parallel cords embedded in rubber with the individual cords in each ply extending generally transversely of the tire and with each tread ply extending circumferentially of the tire, said tread plies being radially spaced from one another by distances greater than the distances between the plies in the carcass portion with the outermost tread ply disposed adjacent the periphery of the tread and with the innermost tread ply spaced from said carcass plies, the longitudinal bias angle and the width of said tread plies increasing progressively from the outer to the inner tread ply with the bias angle of the outer tread ply being in the order of 20° and the bias angle of the inner tread ply being less than that of the outer carcass ply.

6. A high speed generally toroidal pneumatic tire having laterally spaced radially inward bead portions, a generally toroidal carcass portion connecting said bead portions, and a rubber tread portion, said carcass portion comprising bias-laid plies of cord material extending from bead to bead and embedded in rubber, said tread portion comprising a body of tread rubber bonded to said carcass portion, said tread portion having formed therein a plurality of depressions extending radially inwardly from the tread periphery, said tread rubber having embedded therein a plurality of tread plies, said tread plies each comprising a circumferentially extending layer of elongated generally parallel cords embedded in rubber with the individual cords in each tread ply extending transversely of the tire and at an acute longitudinal bias angle to the circumferential center line of the ply and with the angular direction of the cords in adjacent tread plies alternating, each of said tread plies being radially spaced from adjacent tread plies by distances greater than the distances between the plies in the carcass portion with the outermost tread ply disposed adjacent the periphery of the tread and with the innermost tread ply spaced from said carcass plies, the longitudinal bias angle of said tread plies increasing from a longitudinal bias angle in the order of 20 degrees to a bias angle less than that of the outermost carcass ply, when passing from a radially outer tread ply to a radially inner tread ply, the outermost tread ply having undulations formed therein so that portions of the ply are embedded in the tread rubber both between said depressions and radially inwardly of the depressions.

References Cited in the file of this patent

UNITED STATES PATENTS

| Number | Name | Date |
|---|---|---|
| 1,616,069 | Tuttle et al. | Feb. 1, 1927 |
| 1,846,269 | Musselman | Feb. 23, 1932 |
| 2,006,315 | Hopkinson | June 25, 1935 |
| 2,153,965 | Lejeune | Apr. 11, 1939 |
| 2,432,630 | Purdy | Dec. 16, 1947 |

FOREIGN PATENTS

| Number | Country | Date |
|---|---|---|
| 429,519 | France | Sept. 25, 1911 |